United States Patent
Rowe et al.

(10) Patent No.: US 8,904,418 B1
(45) Date of Patent: Dec. 2, 2014

(54) LOGGING TV VIEWING ACTIVITIES USING AN INFRARED DETECTOR

(71) Applicants: Simon Michael Rowe, Berkshire (GB); Nick Arini, Southhampton (GB); Owen Charlebois, Columbia, MD (US)

(72) Inventors: Simon Michael Rowe, Berkshire (GB); Nick Arini, Southhampton (GB); Owen Charlebois, Columbia, MD (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/633,065

(22) Filed: Oct. 1, 2012

(51) Int. Cl.
*H04H 60/32* (2008.01)
*H04N 7/173* (2011.01)
*H04N 21/24* (2011.01)

(52) U.S. Cl.
CPC ..................................... *H04N 21/24* (2013.01)
USPC ............................. 725/14; 725/105; 725/110

(58) Field of Classification Search
CPC .......... H04N 21/442; H04N 21/44204; H04N 21/44213; H04N 21/44223; H04N 21/4532; H04N 21/4667
USPC ........................................... 725/14, 105, 110
See application file for complete search history.

(56) References Cited

U.S. PATENT DOCUMENTS

| | | | |
|---|---|---|---|
| 5,382,970 A * | 1/1995 | Kiefl | 725/18 |
| 2006/0090131 A1* | 4/2006 | Kumagai | 715/700 |
| 2009/0007169 A1* | 1/2009 | Headley et al. | 725/14 |
| 2010/0293567 A1* | 11/2010 | Gaudreau et al. | 725/14 |

* cited by examiner

*Primary Examiner* — Hai V Tran
(74) *Attorney, Agent, or Firm* — Morgan, Lewis & Bockius LLP

(57) ABSTRACT

A system for logging the TV viewing activities at a household includes a TV messaging device at the household and a remote TV viewership measurement server communicatively coupled to the messaging device. The TV messaging device receives an infrared signal including a TV operation code from a remote control device within the household. The infrared signal is directed to a particular TV to perform a predefined operation. The TV messaging device generates a TV operation message including the TV operation code and a household identifier associated with the household and transmits the TV operation message to the TV viewership measurement server. Upon receipt of the TV operation message, the TV viewership measurement server tries to identify one of multiple TV devices within the household as being the target of the TV operation code and updates TV viewership data associated with the household in accordance with the TV operation code.

30 Claims, 7 Drawing Sheets

US 8,904,418 B1

LOGGING TV VIEWING ACTIVITIES USING AN INFRARED DETECTOR

TECHNICAL FIELD

The disclosed implementations relate generally to a TV viewership logging system, and in particular, to system and method for logging the viewing activities of individuals that watch a TV using an infrared detector.

BACKGROUND

TV viewership is an important parameter in the TV broadcasting industry. It can determine the popularity of a TV program among different groups of TV audiences. Based on such information, a TV advertiser can decide, e.g., how to allocate advertisements among different TV programs so that a particular advertisement is broadcast to the target audiences. But conventional approaches of collecting TV viewership data from different households often require the deployment of expensive hardware equipment, making it less convenient for data collection.

SUMMARY

In accordance with some implementations described below, a method for transmitting a TV operation message from a household to a remote server is disclosed. The method is implemented at a messaging device associated with the household that has memory and one or more processors, the method including: receiving an infrared signal from a remote control device, wherein the remote control device is used to control a TV device associated with the household and the infrared signal includes a TV operation code; generating a TV operation message including the TV operation code and a household identifier that is uniquely associated with the household; and transmitting the TV operation message to a remote server, wherein the remote server is configured to record a TV operation associated with the TV device in accordance with the TV operation message.

In accordance with some implementations described below, a TV messaging device for transmitting a TV operation message from a household to a remote server is disclosed. The messaging device includes one or more processors, memory, and one or more programs stored in the memory and to be executed by the one or more processors, the one or more programs including instructions for: receiving an infrared signal from a remote control, wherein the remote control is used to control a TV device associated with the household and the infrared signal includes a TV operation code; generating a TV operation message including the TV operation code and a household identifier that is uniquely associated with the household; and transmitting the TV operation message to a remote server, wherein the remote server is configured to record a TV operation associated with the TV device in accordance with the TV operation message.

In accordance with some implementations described below, a method for updating TV viewership data for a household is disclosed. The method is implemented at a computer server having memory and one or more processors, including: receiving a message from a messaging device associated with the household, wherein the message includes a household identifier and a TV operation code; selecting one or more TV devices associated with the household identifier, wherein the one or more TV devices are associated with the household; identifying one of the one or more TV devices that matches the TV operation code; and updating TV viewership data associated with the household in accordance with the TV operation code.

In accordance with some implementations described below, a computer system for updating TV viewership data for a household is disclosed. The computer system includes one or more processors, memory, and one or more programs stored in the memory and to be executed by the one or more processors, the one or more programs including instructions for: receiving a message from a messaging device associated with the household, wherein the message includes a household identifier and a TV operation code; selecting one or more TV devices associated with the household identifier, wherein the one or more TV devices are associated with the household; identifying one of the one or more TV devices that matches the TV operation code; and updating TV viewership data associated with the household in accordance with the TV operation code.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

DETAILED DESCRIPTION

Figure 1:
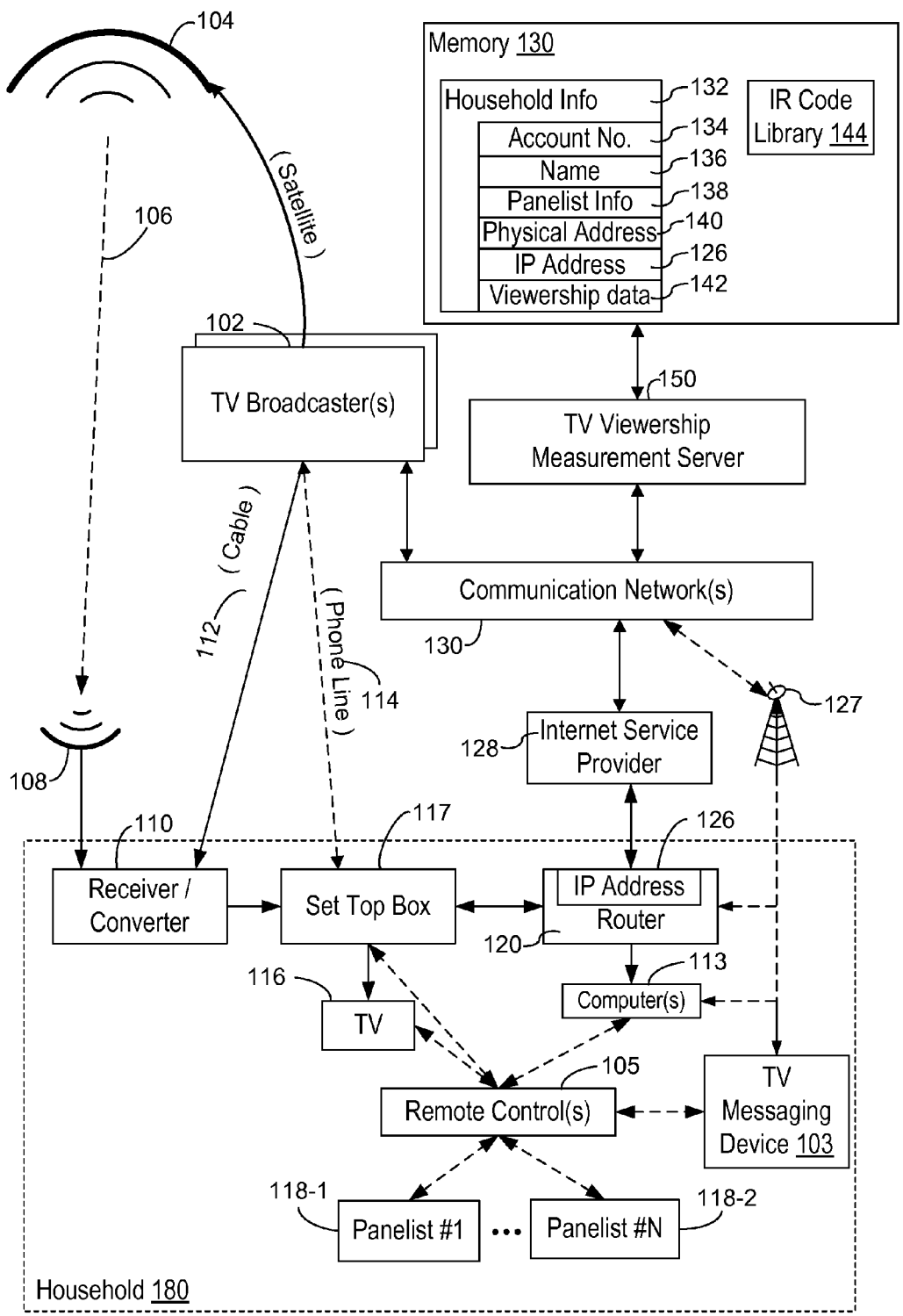
FIG. 1 is a block diagram illustrating a distributed TV content delivery system including a plurality of communication channels for delivering TV signals to a household and a distributed TV viewership measurement system including a TV viewership measurement server and TV viewership survey equipment at the household in accordance with some implementations.

FIG. 1 is a block diagram illustrating a distributed TV content delivery system including a plurality of communication channels for delivering TV signals to a household and a distributed TV viewership measurement system including a TV viewership measurement server and TV viewership survey equipment at the household in accordance with some implementations. The distributed TV content delivery system includes one or more TV broadcasters 102 that provide TV programs to its subscriber households that are retained for providing their household members' TV viewing activity information to the TV viewership measurement server 150. Each household has an account at the TV viewership measurement server 150, which stores the account information database 132 associated with the household in its memory 130. In some implementations, the account information database 132 includes an account number 134, a name 136, information 138 of panelists from the household, a physical address 140, an IP address 126, and the TV viewership data 142. In some implementations, with the consent of the panelists, the panelist information 138 may include various parameters that characterize the household members. In some implementations, the TV viewership data 142 includes information on every TV program viewed by the household, including, for each program, a name and description of the program, the channel that played the program, the date/time of the viewing, etc. In other implementations, the TV viewership data 142 includes only programs that are viewed for at least a threshold amount of time (e.g., 1 minute or 5 minutes) as well as the start time of a program and the end time of the program. The TV viewership measurement server 150 is configured to analyze the TV viewership data from different households to determine the TV viewership ratings of one or more TV programs.

As show in FIG. 1, the TV broadcasters 102 may transmit the television programs to the household 180 over a cable 112, by transmission from a satellite 104, or by streaming over the Internet. In the case of satellite transmissions 106, the household 180 has a receiver antenna 108 to receive the signal. In the household 180 there is a receiver or converter 110 to process or decode the incoming TV signals. The decoded TV signals are transmitted to a set top box 117, which allows household members (118-1, 118-2) to control what is to be played on the television 116. In some implementations, the receiver/converter 110 is combined with the set top box 117. In general, a household member, such as member 118-1 or 118-2 controls the set top box 117 with a remote control device 105. In some implementations, there is additional communication between the TV broadcaster 102 and the set top box 117 over a telephone line 114. For example, the set top box 117 may provide information about what television programs are being viewed to the TV broadcaster 102, or may receive further information for interactive television programs from the TV broadcaster 102.

The actual television program signals are generally transmitted by satellite 104 or over a cable 112. In some implementations, the television programs are streamed over the communications network 130, such as the Internet. In these implementations, the process of selecting a television program may be performed by a computer 113, the set top box 117, or the receiver/converter 110 that is connected directly to the household router 120. The household router 120 is the gateway to the Internet from the household 180. Inside the household 180, the router 120 is connected to the set top box 117 and one or more computers 113. The router 120 is connected to the communication network 130 through an Internet service provider 128. The Internet service provider 128 assigns the IP address 126 to the home router 120.

In some implementations, the set top box 117 is able to ascertain the program viewed by evaluating the TV signals received from the receiver/converter 110. In this case, the set top box 117 transmits the TV viewing activity information (e.g., program, channel, date/time, etc.) to the TV viewership measurement server 150, via the household router 120. Because the viewing activity information is transmitted through the household router 120, the IP address 126 of the household router 120 is also transmitted to the TV broadcaster 102 along with the TV viewing activity information. In some implementations the IP address 126 and/or viewing activity information is transmitted to the TV viewership measurement server 150 on a periodic basis (e.g., once a day). Between two transmissions, the TV viewing activity information is stored in the set top box 117. In some of these implementations, the set top box 117 is able to retrieve the IP address 126 from the router 120 and transmit it with the TV viewing activity information.

In some implementations, the TV viewership measurement server 150 needs to receive an explicit authorization from each household 180 before collecting any TV viewing activity information from the household. For example, the household 180 may provide this authorization as part of the contract it has with the TV broadcaster 102. Alternatively, the household 180 may have a separate contract with an agency that operates the TV viewership measurement server 150 according to which the household 180 provides information about its household members and agrees to provide its TV viewing activity information to the agency. In either case, the household 180 is provided with certain equipment (e.g., the set top box 117 or the like), which is used for collecting the TV viewing activity information and reporting the information to the TV viewership measurement server 150.

Besides the set top box 117, a TV messaging device 103 may be deployed in the household 180 that has agreed to be surveyed to collect the TV viewing activity information from the household 180 and transmit such information to the TV viewership measurement sever 150. In some cases, the set top box 117 is provided by the TV broadcaster 102 with the feature of collecting the TV viewing activity information being switch on. Unless there is a separate agreement between the TV broadcaster 102 and the agency that runs the TV viewership measurement server 150, the TV viewership data collected by the set top box 117 is not available to the agency. In this case, the TV viewership measurement server 150 may rely upon the TV messaging device 103 for providing the TV viewership data. In some other cases, the set top box 117 may be provided by the agency that runs the TV viewership measurement server 150. In the case, the TV viewership data collected by the TV messaging device 103 may be supplemental to the TV viewership data collected by the set top box 117.

As shown in FIG. 1, the panelists (118-1, 118-2) in the household 180 use the remote control device 105 to control the TV 116. For example, in response to a user press of the "On" button of the remote control device 105, the remote control device 105 sends an infrared (IR) signal to the TV 116. After successfully decoding the IR signal, the TV 116 powers on. In response to an IR signal of changing channel or volume from the remote control device 105, the TV 116 changes its broadcasting channel or increases/decreases the sound volume accordingly. It should be noted that a television (or a set top box) has been programmed to understand and respond to only a particular set of predefined IR signals. For example, different TV manufacturers agree to use different codes to program their products' remote control devices such that a TV set from one manufacturer can only decode the IR signals generated by a remote control device from the manufacturer and then act accordingly. In other words, the TV 116 should not respond to the IR signals from a remote control device associated with a game console or a DVD player located next to the TV 116 (not shown in FIG. 1) although the TV 116 may receive such IR signals. Of course, an IR signal for changing the volume of the DVD player will be forwarded to the TV 116 through a separate wired or wireless connection between the DVD player and the TV 116 to adjust the volume of the speaker of the TV 116.

The broadcasting nature of IR signals makes it possible for one device to capture the IR signals generated by different remote control devices within a household and then forward the IR signals to another device for further decoding and analysis. The TV messaging device 103 is of such nature. In some implementations, the TV messaging device 103 includes at least two components: (i) a receiver module for receiving IR signals from the remote control device(s) 105 in the household; and (ii) a transmitter module for transmitting the received IR signals to the TV viewership measurement server 150. A more detailed description of the TV messaging device 103 is provided below in connection with FIG. 2. As shown in FIG. 1, there are multiple possible communication channels between the TV messaging device 103 and the TV viewership measurement server 150. In some implementations, there is a Wi-Fi connection between the TV messaging device 103 and the computer 113 (or the router 126) through which the IR signals captured by the TV messaging device 103 is ultimately transmitted to the TV viewership measurement server 150. In some implementations, there is a wired connection (e.g., a USB cable) between the TV messaging device 103 and the computer 113 (or the router 126). In some implementations, the TV messaging device 103 is equipped with a wireless communication module so that it can exchange data with the TV viewership measurement server 150 via a nearby base station 127. In any case, the TV viewership measurement server 150 can decode each received IR signal to determine which device (TV, set top box, game console, etc.) the IR signal is directed at and what operation the device should take accordingly based on a list of IR codes stored in the IR code library 144 of the memory 130.

Figure 2:
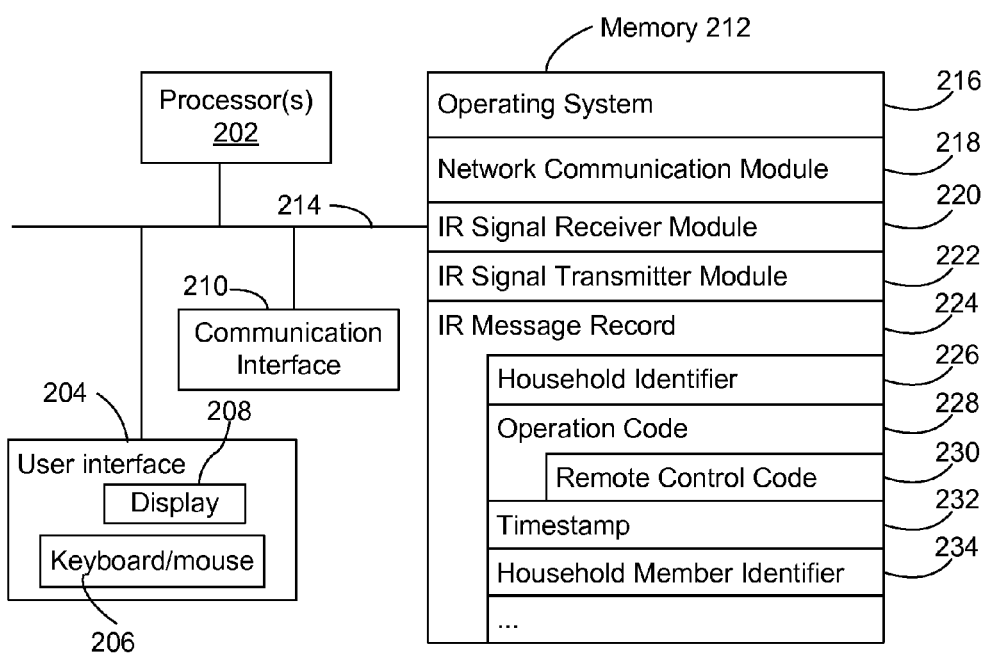
FIG. 2 is a block diagram illustrating the components of a TV messaging device that are configured for reporting the TV viewing activities of one or more household members to a remote server in accordance with some implementations.

FIG. 2 is a block diagram illustrating the components of a TV messaging device 103 that are configured for reporting the TV viewing activities of one or more household members to a remote server in accordance with some implementations. The TV messaging device 103 includes one or more processors 202 for executing modules, programs and/or instructions stored in memory 212 and thereby performing predefined operations; one or more network or other communications interfaces 210; memory 212; and one or more communication buses 214 for interconnecting these components. In some implementations, the TV messaging device 103 includes a user interface 204 comprising a display device 208 and one or more input devices 206 (e.g., keyboard or mouse). In some implementations, the TV messaging device 103 is a mobile communication device including a smartphone or a tablet computer.

In some implementations, the memory 212 includes high-speed random access memory, such as DRAM, SRAM, DDR RAM or other random access solid state memory devices. In some implementations, the memory 212 includes non-volatile memory, such as one or more magnetic disk storage devices, optical disk storage devices, flash memory devices, or other non-volatile solid state storage devices. In some implementations, the memory 212 includes one or more storage devices remotely located from the processor(s) 202. Memory 212, or alternately one or more storage devices (e.g., one or more nonvolatile storage devices) within the memory 212, includes a non-transitory computer readable storage medium. In some implementations, the memory 212 or the computer readable storage medium of the memory 212 stores the following programs, modules and data structures, or a subset thereof:

- an operating system 216 that includes procedures for handling various basic system services and for performing hardware dependent tasks;
- a network communications module 218 that is used for connecting the TV messaging device 103 to other computers (e.g., the computer 113, the router 126 or the base station 127) via the communication network interfaces 210 and one or more communication networks (wired or wireless), such as the Internet, other wide area networks, local area networks, metropolitan area networks, etc.;
- an IR signal receiver module 220 for receiving IR signals generated by the remote control devices 105;
- an IR signal transmitter module 222 for transmitting the digitized equivalents of the IR signals from the remote control devices 105 to a remote server (e.g., the TV viewership measurement server 150); and
- a plurality of IR message records 224, each record corresponding to an IR signal received by the TV messaging device 103.

In some implementations, the TV messaging device 103 converts a newly received IR signal into an IR message record 224 in its memory. The IR message record 224 includes an operation code 228 indicating what operation the device should take. In some implementations, the operation code 228 further includes a remote control code 230 assigned to a particular remote control device that is responsible for generating the IR signal. In some implementations, the IR message record 224 also includes a timestamp 232 indicating when the record 224 was generated, a household ID 226 (e.g., the IP address 126) so that the TV viewership measurement server 150 can uniquely associate the IR message record 224 with a particular household. In some implementations, the IR message record 224 may include a household member identifier 234 that indicates which household member is responsible for generating the corresponding IR signal. For example, a household member may uniquely identify him or herself by pressing a corresponding button on the remote control device 105 before or after the generation of the IR signal including the operation code. A more detailed description of the operation of the TV messaging device 103 is provided below in connection with FIGS. 4 and 5A.

Figure 3:
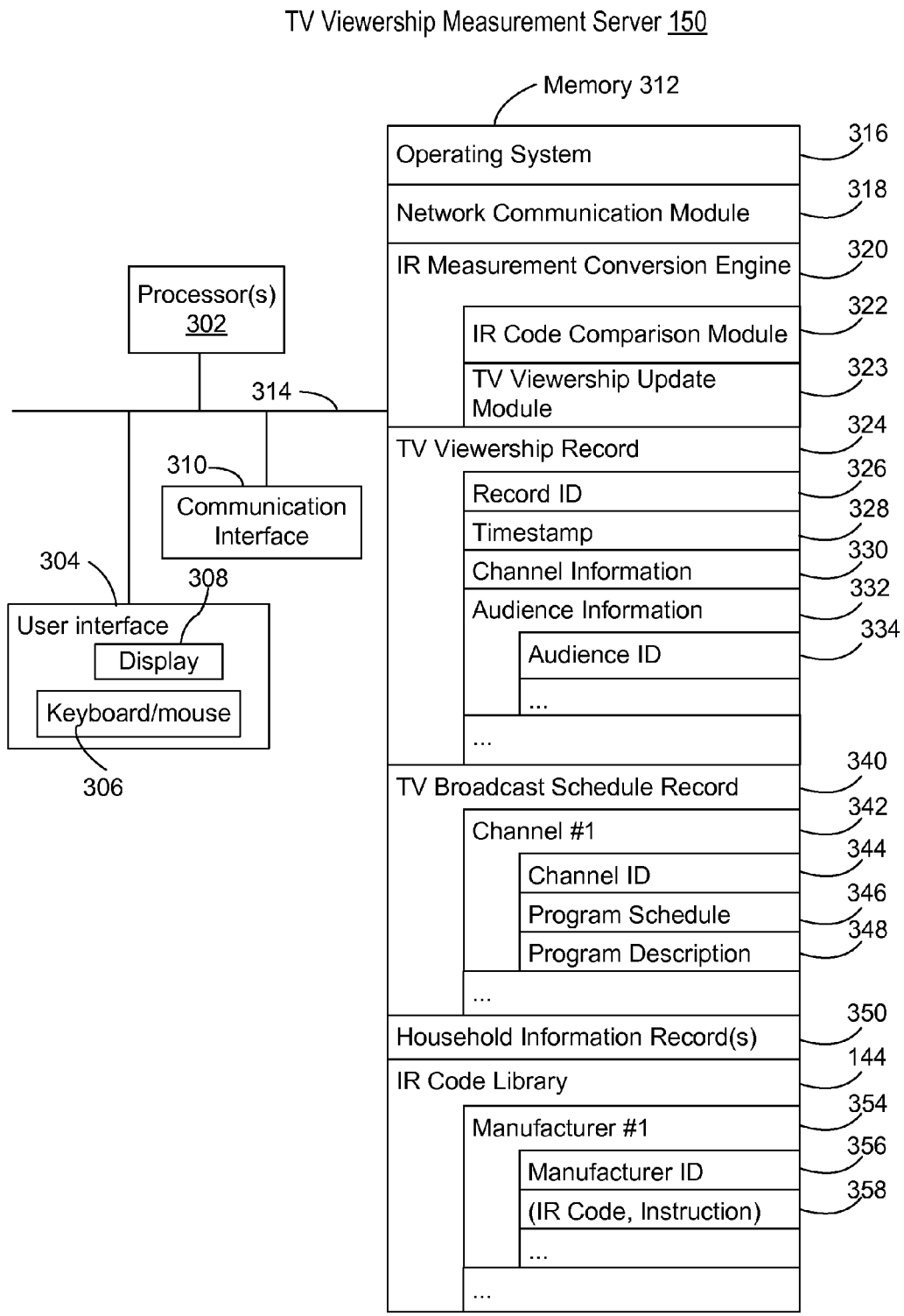
FIG. 3 is a block diagram illustrating the components of a TV viewership measurement server that are configured for updating TV viewership data for a household based on the IR signal-based messages from the household in accordance with some implementations.

FIG. 3 is a block diagram illustrating the components of a TV viewership measurement server 150 that are configured for updating TV viewership data for a household based on the IR signal-based messages from the household in accordance with some implementations. The TV viewership measurement server 150 includes one or more processors 302 for executing modules, programs and/or instructions stored in memory 312 and thereby performing predefined operations; one or more network or other communications interfaces 310; memory 312; and one or more communication buses 314 for interconnecting these components. In some implementations, the measurement server 150 includes a user interface 304 comprising a display device 308 and one or more input devices 306 (e.g., keyboard or mouse).

In some implementations, the memory 312 includes high-speed random access memory, such as DRAM, SRAM, DDR RAM or other random access solid state memory devices. In some implementations, the memory 312 includes non-volatile memory, such as one or more magnetic disk storage devices, optical disk storage devices, flash memory devices, or other non-volatile solid state storage devices. In some implementations, the memory 312 includes one or more storage devices remotely located from the processor(s) 302. Memory 312, or alternately one or more storage devices (e.g., one or more nonvolatile storage devices) within the memory 312, includes a non-transitory computer readable storage medium. In some implementations, the memory 312 or the computer readable storage medium of the memory 312 stores the following programs, modules and data structures, or a subset thereof:

- an operating system 316 that includes procedures for handling various basic system services and for performing hardware dependent tasks;
- a network communications module 318 that is used for connecting the TV viewership measurement server 150 to other computers via the communication network interfaces 310 and one or more communication networks (wired or wireless), such as the communication networks 130 (e.g., Internet), other wide area networks, local area networks, metropolitan area networks, etc.;
- an IR measurement conversion engine 320 for converting the received IR messages into corresponding TV viewership records, the engine 320 including an IR code comparison module 322 for comparing the received remote control code with the IR code library 144 and a TV viewership update module 323 for updating the TV viewership data associated with a household responsible for generating the corresponding IR message;
- a plurality of TV viewership records 324, each TV viewership record including a record ID 326, a recording timestamp 328, channel information 330, and audience information 332 including audience IDs 334;
- a plurality of TV broadcast schedule records 340, each TV broadcast schedule record including information of a channel 342, such as a channel ID 344, a program schedule 346, and a program description 348;
- a plurality of household information records 350, such as the household information in the account information database 132; and
- an IR code library 352 that includes information of different TV or set top box equipment manufacturers 354, such as a manufacturer ID 356 and one or more pairs of (IR code, instruction) 358.

In some implementations, upon receipt of an IR message from a particular TV messaging device, the IR measurement conversion engine 320 extracts the operation code 228, the household identifier 226, and possibly the household member identifier 234 (if it exists) from the message and updates an existing TV viewership record 324 (or generates a new TV viewership record) based on the extracted information and the TV broadcasting schedule records 340, the household information records 350, and the IR code library 352. A more detailed description of the operation of the TV viewership measurement server 150 is provided below in connection with FIGS. 4 and 5B-5C.

Having described the components of the TV messaging device 103 and the TV viewership measurement server 150, a set of flow charts are now described that illustrate how the TV messaging device 103 and the TV viewership measurement server 150 operate individually and/or collaboratively to keep track of the TV viewing activities at a household using the IR signals collected from the household.

Figure 4:
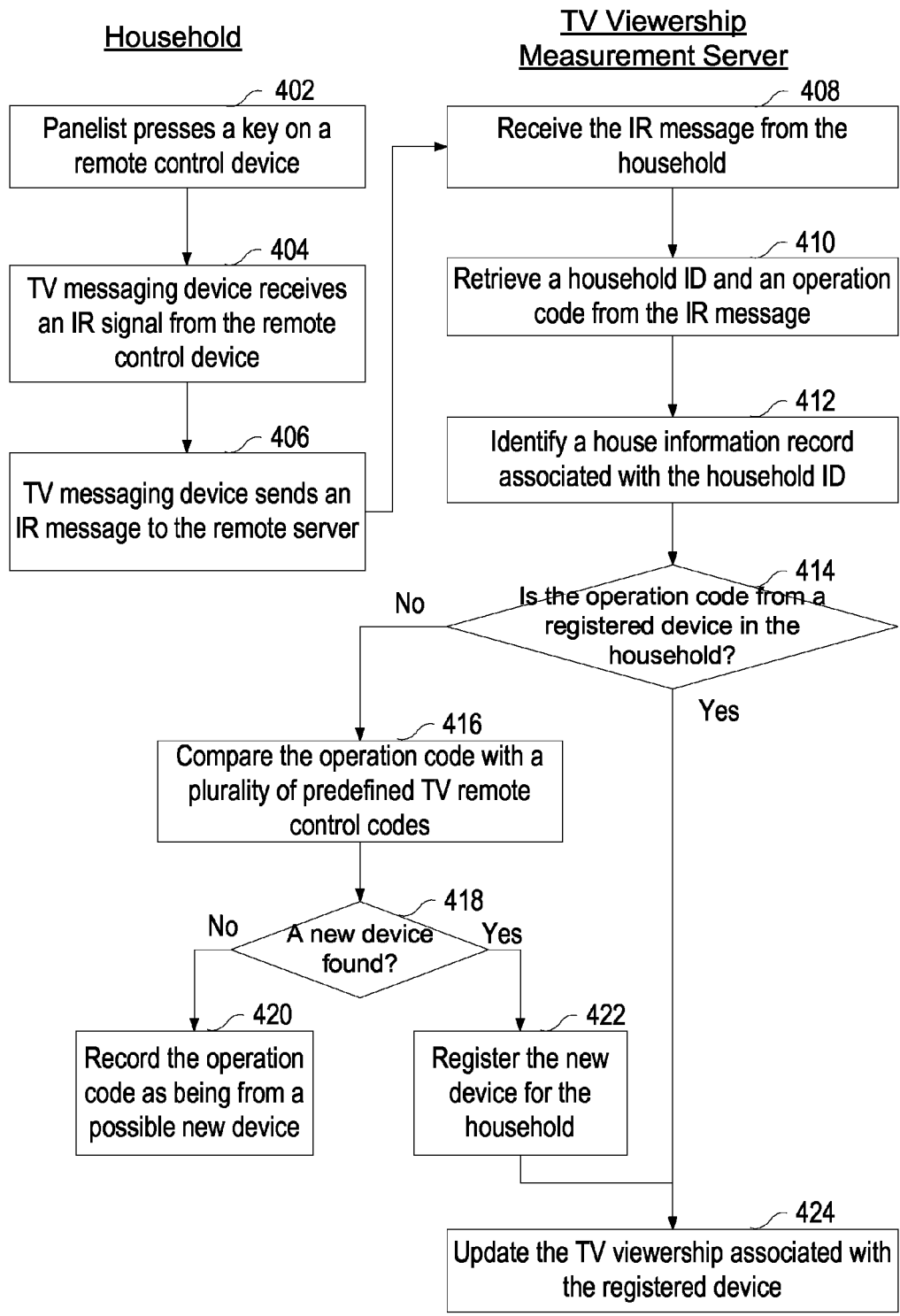
FIG. 4 is a flow chart illustrating how a TV messaging device and a TV viewership measurement server interact with each other so as to update the TV viewership data for a household in accordance with some implementations.

FIG. 4 is a flow chart illustrating how a TV messaging device and a TV viewership measurement server interact with each other so as to update the TV viewership data for a household in accordance with some implementations.

The process starts with a panelist (e.g., a household member) pressing a key or button on a remote control device (402). For example, the panelist may sit in the living room and decide to turn on/off a TV or change the TV from one channel to another channel. As noted above, the remote control device 105 sends out an IR signal in response to the panelist's press of the key. If there is a TV messaging device near the remote control device (e.g., if the TV messaging device is also located in the same room), the TV messaging device receives the IR signal from the remote control device (404). In some implementations, the TV messaging device performs one or more operations to the received IR signal. For example, the TV messaging device may generate an IR message by extracting information from the IR signal and combining the extracted information with the other information such as a household identifier, a timestamp, and a household member identifier and then sending the IR message representing a particular TV-related operation to the TV viewership measurement server (406). Sometimes, the TV messaging device may convert the IR signal into a digital signal without performing further analysis.

In some implementations, the TV messaging device stores all the IR signals from the remote control device in a log file within its memory so that the TV messaging device can compare a newly-received IR signal with some previously-received IR signals before taking any further action. For example, upon receipt of an IR signal representing a command of turning off a TV, the TV messaging device may need to determine whether there was an IR signal representing a command of turning on the TV. This is useful when a household member presses a wrong key (e.g., pressing the "Off" button when the TV is off). By comparing the new IR signal with the previously-received signals, the TV messaging device can determine whether the TV will actually respond to this IR signal. If not, the TV messaging device does not need to forward an IR message to the server since this IR signal is effectively a false signal. Sometimes, the TV messaging device may choose not to send an IR message to the server in response to an IR signal that, although not a false signal, but provides little information about the household's TV viewing preference (e.g., the change of audio volume).

Upon receipt of the IR message (408), the TV viewership measurement server retrieves a household identifier and an operation code from the IR message (410). Based on the household identifier, the TV viewership measurement server identifies a household information record (412). The household information record includes not only the demographic information of the household members but also the information of TVs and set top boxes in the household (such as their brands, model numbers, physical locations, and associated remote control devices, etc.). Based on the TV information, the TV viewership measurement server can determine whether the operation code extracted from the IR message is from a registered device in the household (414). For example, if the operation code represents a channel switch instruction to a Sony TV, the TV viewership measurement server needs to determine whether the household information record includes a registered Sony TV that can respond to this operation code. If the registered device is found (414—yes), the TV viewership measurement server then identifies a TV viewership record associated with the household and updates the record accordingly (424).

If no registered device is found to match the operation code (414—no), the TV viewership measurement server then compares the operation code with a plurality of predefined TV remote control codes (416). In some implementations, the TV remote control codes are stored in the IR code library 144 that get updated regularly (e.g., weekly) to keep track of the remote control codes associated with the newly-released products. Generally, whenever a participant household purchases a new TV, it should report the new TV to the TV viewership measurement server by updating its household information record, e.g., in the account information database 132. But if the household starts using a new TV but fails to report such new equipment to the server, the TV messaging device can still capture the IR signals associated with the new TV and report them to the TV viewership measurement server. By updating its IR code library regularly, the TV viewership measurement server may detect the existence of the new TV if the operation code has a match in the IR code library. If so (418—yes), the TV viewership measurement server then registers the new TV in the household information record associated with the household (422) and then updates the TV viewership record associated with the household (424). Otherwise (418—no), the TV viewership measurement server may generate a new entry in the TV viewership record associated with the household (420), the entry indicating that the operation code is from a possibly new device in the household that the server cannot tell its identity temporarily. Subsequently, the server may update such entry after ascertaining the new device associated with the operation code. By doing so, the TV viewership measurement server can retain as much information as possible about the household's TV viewing activities.

In some implementations, the TV messaging device does not perform the operation of screening out false signals as described above. Instead, the TV messaging device forwards all the received IR signals or the equivalents (e.g., IR messages) to the TV viewership measurement server and lets the server eliminate those false signals. In this case, the TV viewership measurement server may perform a lookup option to the TV viewership record to determine whether a newly-received operation code corresponds to an actual operation or is merely a false signal. For example, if the operation code corresponds to a channel switch but there is no indication in the TV viewership record that the TV has been turned on, the server can skip the operation of updating TV viewership the record (424). Regardless of whether the screening process is performed at the TV messaging device or at the TV viewership measurement server, the logic of filtering out those false IR signals is the same, that is, the validity of a particular IR signal or the corresponding operation code depends on the preceding IR signals emitted from the same remote control device. In some implementations, the TV viewership measurement server breaks the TV viewership data for a particular household into multiple sessions such that each session begins with a turn-on operation and ends with a turn-off operation.

Figure 5A:
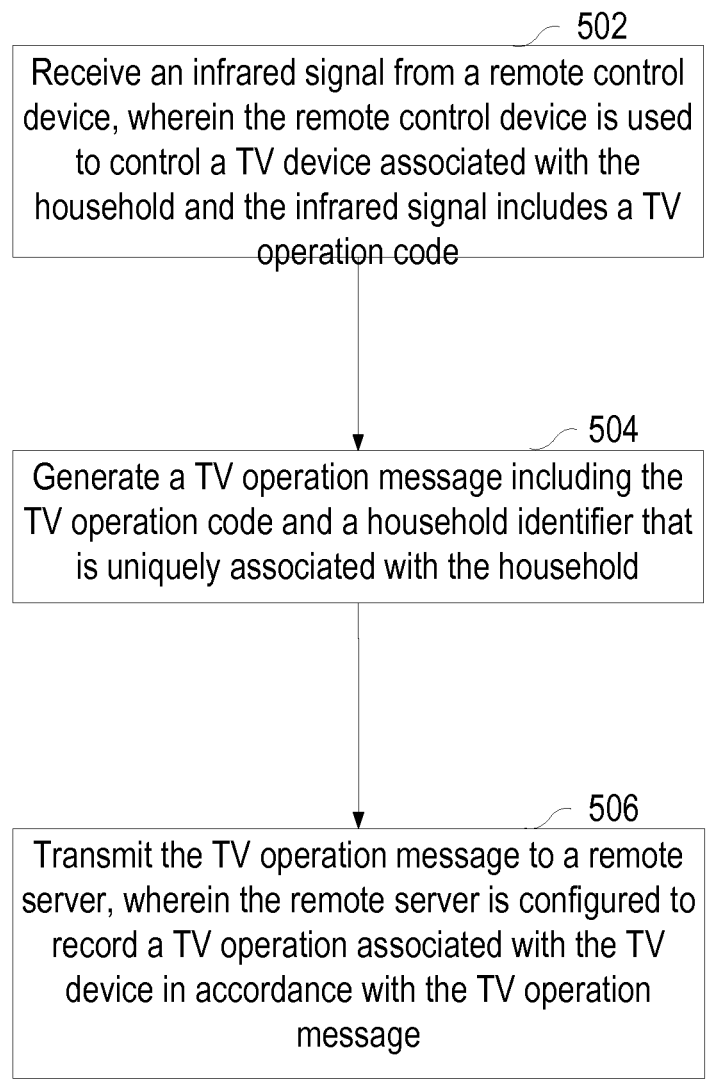
FIG. 5A is a flow chart illustrating how a TV messaging device within a household generates and reports TV operation messages to a TV viewership measurement server in accordance with some implementations.

FIG. 5A is a flow chart illustrating how a TV messaging device within a household generates and reports TV operation messages to a TV viewership measurement server in accordance with some implementations. First, the TV messaging device receives an IR signal from a remote control device (502). The remote control device is used to control a particular TV device within the household and the IR signal includes a TV operation code that directs the TV device to perform a predefined operation. In response to the IR signal, the TV messaging device generates a TV operation message including the TV operation code and a household identifier that is uniquely associated with the household (504). For example, the household identifier may be the household's IP address or a unique alphanumeric number assigned to the household when the household agrees to report its TV viewership data to the TV viewership measurement server. The TV operation code is configured to cause the TV device to perform one or more operations including: switching on the TV device, switching off the TV device, and changing a broadcast of the TV device from a first channel to a second channel. Finally, the TV messaging device transmits the TV operation message to the TV viewership measurement server (506), a remote server that is configured to record a TV operation associated with the TV device in accordance with the TV operation message.

Figure 5B:
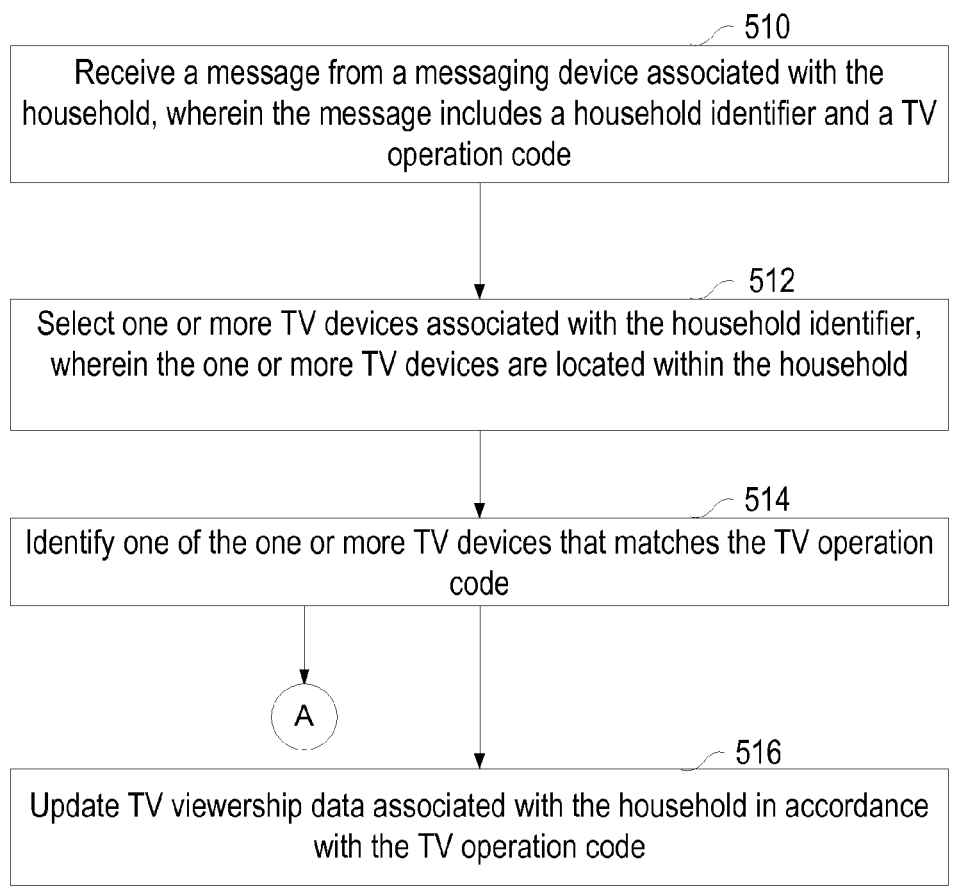
FIGS. 5B and 5C are flow charts illustrating how a TV viewership measurement server processes TV operation messages from a household and updates the TV viewership data for the household accordingly in accordance with some implementations.
Figure 5C:
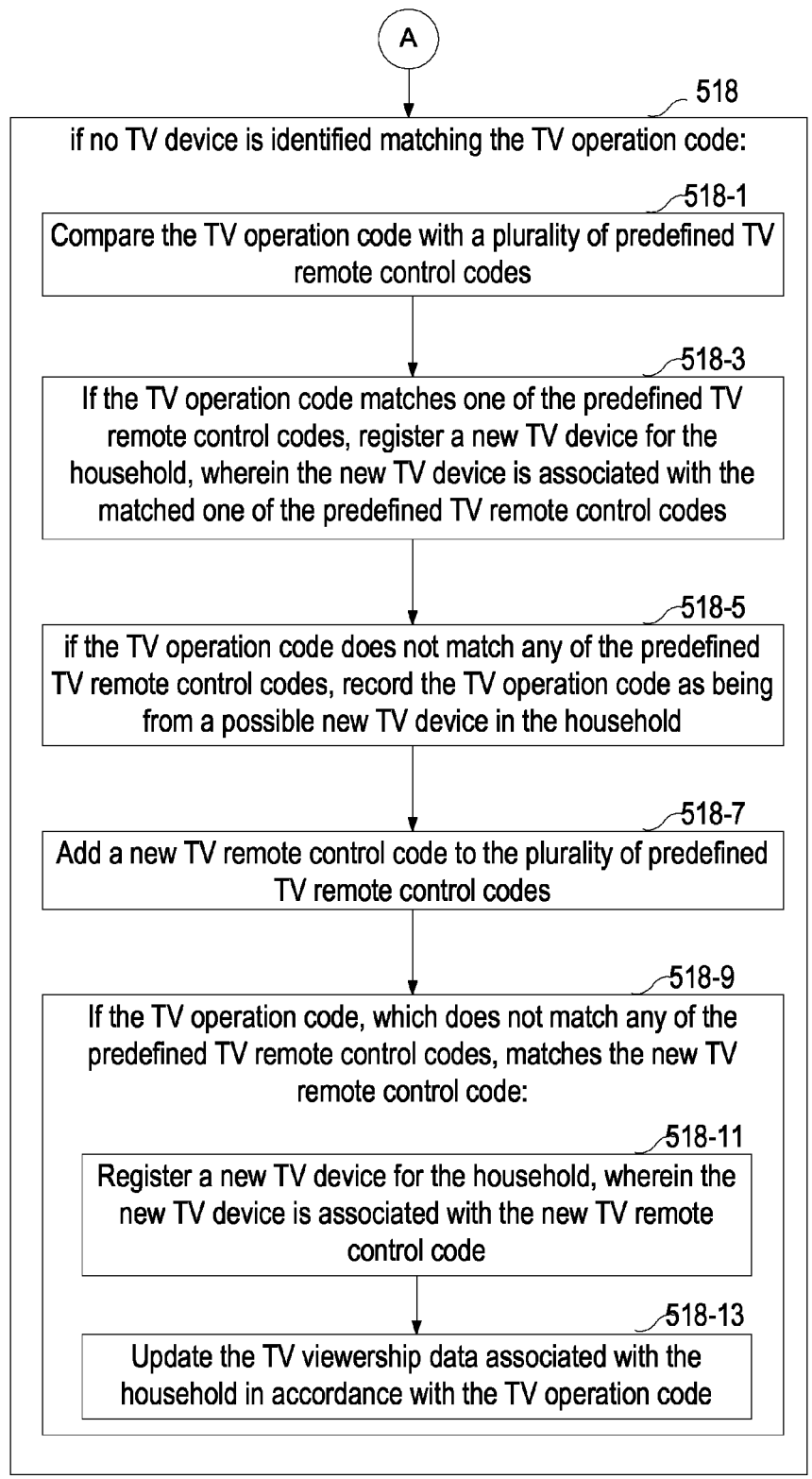

FIGS. 5B and 5C are flow charts illustrating how a TV viewership measurement server processes TV operation messages from a household and updates the TV viewership data for the household accordingly in accordance with some implementations.

Upon receipt of a message from a messaging device associated with the household (510), the TV viewership measurement server selects one or more TV devices associated with the household (512). In some implementations, the messaging device is a device selected from the group consisting of a smartphone, a router, and a personal computer, and the messaging device includes a receiver for receiving and processing IR signals from the remote control. Sometimes, the messaging device is built into a remote control device. The message includes a household identifier and a TV operation code. The TV devices are identified as being located within the household based on a household information record associated with the household identifier. Next, the TV viewership measurement server identifies one of the TV devices matching the TV operation code in the message (514). As noted above, TVs from different manufacturers are configured to respond to different predefined sets of IR signals. For a particular TV operation code, the TV viewership measurement server can uniquely determine which TV this code is directed at and what operation the TV should take accordingly. If a TV within the household is identified for the TV operation code, the TV viewership then updates the TV viewership data associated with the household in accordance with the TV operation code (516).

As shown in FIG. 5C, if no TV is identified matching the TV operation code (518), the TV viewership measurement server then compares the TV operation code with a plurality of predefined TV remote control codes in an IR code library stored at the server (518-1). As noted above, there are two possibilities: (i) if the TV operation code matches one of the predefined TV remote control codes, the TV viewership measurement server then registers a new TV device for the household (518-3), the new TV device being associated with the matched TV remote control code; or (ii) if the TV operation code does not match any of the predefined TV remote control codes, the TV viewership measurement server then records the TV operation code as being from a possible new TV device in the household (518-5).

As noted above, the TV viewership measurement server updates its IR code library on a regular basis. Whenever adding a new TV remote control code to the plurality of predefined TV remote control codes (518-7), the TV viewership measurement server may check if the TV operation code, which does not match any of the predefined TV remote control codes, matches the new TV remote control code (518-9). If so, the TV viewership measurement server then registers a new TV device for the household such that the new TV device is associated with the new TV remote control code (518-11) and then updates the TV viewership data associated with the household in accordance with the TV operation code (518-13).

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method for transmitting a TV operation message from a household to a remote server, comprising:
    receiving, at a messaging device associated with the household, a plurality of infrared signals from a remote control device, wherein the messaging device has memory and one or more processors, and the remote control device is used to control a TV device associated with the household;
    storing the plurality of infrared signals in a log file within a memory of the messaging device;
    receiving, at the messaging device, a new infrared signal from the remote control device, wherein the new infrared signal includes a TV operation code;
    determining, at the messaging device, whether the new infrared signal is a false signal or a low information signal by comparing the new infrared signal with the plurality of infrared signals stored in the log file, wherein the low information signal provides information that is not valuable about the household's viewing preference;
    in accordance with the determination that the new infrared signal is not a false signal or a low information signal, generating, at the messaging device, a TV operation message including the TV operation code and a household identifier that is uniquely associated with the household; and
    transmitting, at the messaging device, the TV operation message to a remote server, wherein the remote server is configured to record a TV operation associated with the TV device in accordance with the TV operation message.

2. The method of claim 1, wherein the infrared signal includes a remote control code that is uniquely associated with the TV device.

3. The method of claim 2, wherein the TV operation code is configured to cause the TV device to perform one or more operations including: switching on the TV device, switching off the TV device, and changing a broadcast of the TV device from a first channel to a second channel.

4. The method of claim 1, wherein the messaging device is a device selected from the group consisting of a smartphone, a router, and a personal computer, and the messaging device includes a receiver for receiving and processing infrared signals from the remote control device.

5. The method of claim 4, wherein the messaging device is configured to transmit the TV operation message to the remote server via a wired connection.

6. The method of claim 4, wherein the messaging device is configured to transmit the TV operation message to the remote server via a wireless connection.

7. The method of claim 1, wherein the messaging device is built into the remote control device.

8. The method of claim 1, wherein the infrared signal includes a household member identifier that is uniquely associated with a member of the household and the household member identifier is sent to the remote server to be part of the recorded TV operation.

9. A messaging device for transmitting a TV operation message from a household to a remote server, comprising:
    one or more processors; and memory storing one or more programs to be executed by the one or more processors, the one or more programs comprising instructions for:
    receiving a plurality of infrared signals from a remote control device, wherein the remote control device is used to control a TV device associated with the household;

storing the plurality of infrared signals in a log file within a memory of the messaging device;

receiving a new infrared signal from the remote control device, wherein the new infrared signal includes a TV operation code;

determining whether the new infrared signal is a false signal or a low information signal by comparing the new infrared signal with the plurality of infrared signals stored in the log file, wherein the low information signal provides information that is not valuable about the household's viewing preference;

in accordance with the determination that the new infrared signal is not a false signal or a low information signal, generating a TV operation message including the TV operation code and a household identifier that is uniquely associated with the household; and transmitting the TV operation message to a remote server, wherein the remote server is configured to record a TV operation associated with the TV device in accordance with the TV operation message.

10. The messaging device of claim 9, wherein the infrared signal includes a remote control code that is uniquely associated with the TV device.

11. The messaging device of claim 10, wherein the TV operation code is configured to cause the TV device to perform one or more operations including: switching on the TV device, switching off the TV device, and changing a broadcast of the TV device from a first channel to a second channel.

12. The messaging device of claim 9, wherein the messaging device is a device selected from the group consisting of a smartphone, a router, and a personal computer, and the messaging device includes a receiver for receiving and processing infrared signals from the remote control.

13. The messaging device of claim 9, wherein the messaging device is built into the remote control.

14. The messaging device of claim 9, wherein the infrared signal includes a household member identifier that is uniquely associated with a member of the household and the household member identifier is sent to the remote server to be part of the recorded TV operation.

15. A computer-implemented method for updating TV viewership
data for a household, comprising:

receiving, at a computer server having memory and one or more processors, a message from a messaging device associated with the household, wherein the message includes a household identifier and a TV operation code;

selecting, at the computer server, one or more TV devices associated with the household identifier, wherein the one or more TV devices are associated with the household;

identifying, at the computer server, one of the one or more TV devices that matches the TV operation code, wherein the identifying operation includes:

determining whether any TV device associated with the household identifier matches the TV operation code, and in accordance with the determination that no TV device matches the TV operation code: comparing the TV operation code with a plurality of predefined TV remote control codes, and, if the TV operation code matches one of the predefined TV remote control codes, logging the TV operation code as being from a new TV device in the household; and updating, at the computer server, TV viewership data associated with the household in accordance with the TV operation code.

16. The computer-implemented method of claim 15, further comprising:

adding a new TV remote control code to the plurality of predefined TV remote control codes;

if the TV operation code, which does not match any of the predefined TV remote control codes, matches the new TV remote control code:

registering a new TV device for the household, wherein the new TV device is associated with the new TV remote control code; and updating the TV viewership data associated with the household in accordance with the TV operation code.

17. The computer-implemented method of claim 15, wherein the TV operation code is generated by a remote control associated with the household in the form of an infrared signal.

18. The computer-implemented method of claim 17, wherein the messaging device and the remote control are combined into a single device.

19. The computer-implemented method of claim 17, wherein the infrared signal includes a household member identifier that is uniquely associated with a member of the household and the household member identifier is part of the TV viewership data associated with the household.

20. The computer-implemented method of claim 17, wherein the infrared signal includes a remote control code that is uniquely associated with a particular TV device associated with the household.

21. The computer-implemented method of claim 15, wherein updating TV viewership data associated with the household in accordance with the TV operation code further includes: recording a TV operation associated with the identified TV device, the TV operation including: switching on the identified TV device, switching off the identified TV device, and changing a broadcast of the identified TV device from a first channel to a second channel.

22. The computer-implemented method of claim 15, wherein the messaging device is a device selected from the group consisting of a smartphone, a router, and a personal computer, and the messaging device includes a receiver for receiving and processing infrared signals from the remote control.

23. A computer system for updating TV viewership data for a household, comprising:

one or more processors; and memory storing one or more programs to be executed by the one or more processors, the one or more programs comprising instructions for:

receiving a message from a messaging device associated with the household, wherein the message includes a household identifier and a TV operation code;

selecting one or more TV devices associated with the household identifier, wherein the one or more TV devices are associated with the household;

identifying one of the one or more TV devices that matches the TV operation code, wherein the identifying operation includes:

determining whether any TV device associated with the household identifier matches the TV operation code, and in accordance with the determination that no TV device matches the TV operation code: comparing the TV operation code with a plurality of predefined TV remote control codes, and, if the TV operation code matches one of the predefined TV remote control codes, logging the TV operation code as being from a new TV device in the household; and updating TV viewership data associated with the household in accordance with the TV operation code.

24. The computer system of claim 23, wherein the one or more programs further comprise instructions for:

adding a new TV remote control code to the plurality of predefined TV remote control codes;

if the TV operation code, which does not match any of the predefined TV remote control codes, matches the new TV remote control code:

registering a new TV device for the household, wherein the new TV device is associated with the new TV remote control code; and updating the TV viewership data associated with the household in accordance with the TV operation code.

25. The computer system of claim 23, wherein the TV operation code is generated by a remote control associated with the household in the form of an infrared signal.

26. The computer system of claim 25, wherein the messaging device and the remote control are combined into a single device.

27. The computer system of claim 25, wherein the infrared signal includes a household member identifier that is uniquely associated with a member of the household and the household member identifier is part of the TV viewership data associated with the household.

28. The computer system of claim 25, wherein the infrared signal includes a remote control code that is uniquely associated with a particular TV device associated with the household.

29. The computer system of claim 23, wherein updating TV viewership data associated with the household in accordance with the TV operation code further includes: recording a TV operation associated with the identified TV device, the TV operation including: switching on the identified TV device, switching off the identified TV device, and changing a broadcast of the identified TV device from a first channel to a second channel.

30. The computer system of claim 23, wherein the messaging device is a device selected from the group consisting of a smartphone, a router, and a personal computer, and the messaging device includes a receiver for receiving and processing infrared signals from the remote control.

* * * * *